United States Patent
Handa et al.

(10) Patent No.: US 11,268,194 B2
(45) Date of Patent: Mar. 8, 2022

(54) METAL-PLATED CARBON MATERIAL AND MANUFACTURING METHOD THEREOF

(71) Applicant: Yazaki Corporation, Tokyo (JP)

(72) Inventors: Yutaka Handa, Shizuoka (JP); Hiroki Kondo, Shizuoka (JP); Satoko Hongo, Shizuoka (JP); Yusuke Yoshikawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 3 days.

(21) Appl. No.: 16/828,413

(22) Filed: Mar. 24, 2020

(65) Prior Publication Data
US 2020/0308705 A1 Oct. 1, 2020

(30) Foreign Application Priority Data
Mar. 26, 2019 (JP) .............................. JP2019-057635

(51) Int. Cl.
| C23C 18/16 | (2006.01) |
| B32B 9/04 | (2006.01) |
| C23C 18/14 | (2006.01) |
| B32B 9/00 | (2006.01) |
| C23C 18/32 | (2006.01) |
| B32B 15/04 | (2006.01) |
| C23C 18/40 | (2006.01) |
| C23C 18/18 | (2006.01) |

(Continued)

(52) U.S. Cl.
CPC .......... *C23C 18/1639* (2013.01); *B32B 9/007* (2013.01); *B32B 9/041* (2013.01);
(Continued)

(58) Field of Classification Search
CPC . C23C 18/1639; C23C 18/14; C23C 18/1651; C23C 18/1685; C23C 18/1889;
(Continued)

(56) References Cited

U.S. PATENT DOCUMENTS 4,661,403 A * 4/1987 Morin .................... D01F 11/127
205/138
4,852,453 A * 8/1989 Morin .................... D01F 11/127
89/1.11
(Continued)

FOREIGN PATENT DOCUMENTS

EP 0088884 A1 * 9/1983 .............. D01F 11/10
JP 8-503522 A 4/1996
(Continued)

OTHER PUBLICATIONS

Revesz et al. "Nanocrystallization Studies of an Electroless Plated Ni—P Amorphous Alloy" 2001, Journal of the Electrochemical Society, 148(11), p. C715-C720. (Year: 2001).*
(Continued)

*Primary Examiner* — Humera N. Sheikh
*Assistant Examiner* — John D Schneible
(74) *Attorney, Agent, or Firm* — Sughrue Mion, PLLC

(57) ABSTRACT

A metal-plated carbon material includes: a carbon material; and a metal layer covering a surface of the carbon material, in which, in the metal layer, crystal grains forming the metal layer have an average crystal grain size of 110 nm or less. A method of manufacturing a metal-plated carbon material, includes: a metal complex fixation step of immersing a carbon material in a supercritical fluid or subcritical fluid containing an organometallic complex of a first metal; and a first energization deposition step of energizing the metal-complex-fixed carbon material in an electroless plating solution containing a second metal.

9 Claims, 5 Drawing Sheets

(52) U.S. Cl.
CPC .......... *C23C 18/14* (2013.01); *C23C 18/1651* (2013.01); *B32B 15/04* (2013.01); *B32B 15/043* (2013.01); *B32B 2262/106* (2013.01); *B32B 2307/202* (2013.01); *B32B 2311/04* (2013.01); *B32B 2311/06* (2013.01); *B32B 2311/08* (2013.01); *B32B 2311/09* (2013.01); *B32B 2311/12* (2013.01); *B32B 2311/22* (2013.01); *C23C 18/1671* (2013.01); *C23C 18/1685* (2013.01); *C23C 18/1889* (2013.01); *C23C 18/32* (2013.01); *C23C 18/405* (2013.01); *Y10T 428/12861* (2015.01); *Y10T 428/30* (2015.01)

(58) Field of Classification Search
CPC ..... C23C 18/1671; C23C 18/32; C23C 18/42; C23C 18/405; B32B 9/007; B32B 2311/22; B32B 15/043; B32B 2262/106; B32B 2311/09; B32B 2311/12; B32B 2311/04; B32B 2311/08; B32B 2311/06; B32B 2307/202; B32B 15/04; Y10T 428/30; Y10T 428/12861
USPC .................................. 428/689, 408, 668
See application file for complete search history.

(56) References Cited

U.S. PATENT DOCUMENTS

| | | | |
|---|---|---|---|
| 5,352,266 A | 10/1994 | Erb et al. | |
| 2007/0264451 A1* | 11/2007 | Yusa | B32B 27/205 428/34.1 |
| 2013/0243974 A1* | 9/2013 | Jung | C23C 18/1893 427/560 |
| 2015/0090434 A1 | 4/2015 | Lemak et al. | |
| 2017/0102334 A1* | 4/2017 | Zaretski | C23C 16/01 |

FOREIGN PATENT DOCUMENTS

| | | | | |
|---|---|---|---|---|
| JP | 2004115959 A | * | 4/2004 | ............ C01B 31/02 |
| JP | 2007-186823 A | | 7/2007 | |
| JP | 2008-208456 A | | 9/2008 | |
| JP | 2010-37623 A | | 2/2010 | |
| JP | 2016-535941 A | | 11/2016 | |

OTHER PUBLICATIONS

N.V. Mandich "EMI Shielding by Electroless Plating of ABS Plastics" 1994, Plating and Surface Finishing, CEF, p. 60-63. (Year: 1994).*

Cui et al. "Evolution of microstructure and electrical conductivity of electroless copper deposits on a glass substrate" 2012 Thin Solid Films, 520, p. 6095-6099. (Year: 2012).*

Zheng et al. "Preparation of Nickel-Copper Bilayers Coated on Single-Walled Carbon Nanotubes" 2015, Journal of Nanomaterials, 2015, p. 1-8. (Year: 2015).*

Chen et al. "Properties and microstructure of nickel-coated graphite flakes/copper composites fabricated by spark plasma sintering" 2017, Carbon, 121, p. 25-34. (Year: 2017).*

Boettger-Hiller et al. "Multimetallic Electrodeposition on Carbon Fibers" 2016, IOP Conference Series: Materials Science and Engineering, 118, p. 1-6. (Year: 2016).*

* cited by examiner

100nm

200nm

METAL-PLATED CARBON MATERIAL AND MANUFACTURING METHOD THEREOF

CROSS-REFERENCE TO RELATED APPLICATIONS

The present application is based on, and claims priority from the prior Japanese Patent Application No. 2019-057635, filed on Mar. 26, 2019, the entire contents of which are incorporated herein by reference.

TECHNICAL FIELD

The disclosure relates to a metal-plated carbon material and a manufacturing method thereof.

BACKGROUND

In recent years, reduction in weight of transportation equipment such as automobiles and airplanes has been demanded to improve fuel efficiency. In view of this, the use of carbon fiber reinforced plastic (CFRP) for bodies of the transportation equipment has been studied. However, CFRP has lower conductivity than steel plates. For this reason, in a case where CFRP is used for the bodies of the transportation equipment, the following problems are concerned: grounding cannot be taken; and an electromagnetic wave shielding effect is reduced.

Regarding those problems, plating a carbon material such as carbon fibers with a highly conductive metal such as copper has been studied. Such a related art is disclosed in JP 2007-186823 A and JP 2008-208456 A.

Specifically, J P 2007-186823 A discloses a carbon fiber surface treatment method in which a surface of a carbon fiber is treated with an alkaline degreasing solution to make the surface of the carbon fiber hydrophilic. According to the surface treatment method disclosed in JP 2007-186823 A, a plating solution permeates the inside of the carbon fiber, and therefore it is possible to cause the carbon fiber to uniformly carry a large amount of metal by electroplating.

JP 2008-208456 A discloses a method of manufacturing a metal-plated carbon material, in which a carbon fiber material is immersed in a supercritical fluid or subcritical fluid containing an organometallic complex, and the organometallic complex is reduced and activated, and then electroless plating is performed. According to the method of manufacturing a metal-plated carbon material disclosed in JP 2008-208456 A, a uniform metal film is formed.

SUMMARY

However, the surface treatment method disclosed in JP 2007-186823 A is problematic in that mechanical characteristics of the carbon fiber, such as tensile strength, may be reduced due to alkali treatment. Further, the method of manufacturing a metal-plated carbon material disclosed in JP 2008-208456 A needs a reduction or activation step after adhesion of the organometallic complex. This increases the number of steps, which is problematic. Furthermore, in the method of manufacturing a metal-plated carbon material disclosed in JP 2008-208456 A, in a case where the complex is decomposed and reduced by simple heat treatment, a ligand contained in the complex is decomposed, whereas a metal element is not easily reduced or activated. This decreases plating efficiency, which is problematic. In the method of manufacturing a metal-plated carbon material disclosed in JP 2008-208456 A, in a case where heat treatment is performed in the presence of a gaseous reducing agent such as hydrogen gas, the metal element can be reduced or activated. In this case, however, an increase in costs is problematic.

The disclosure has been made in view of the above problems. An object of the disclosure is to provide a metal-plated carbon material and a manufacturing method thereof, by which a metal-plated carbon material having high mechanical characteristics and high plating efficiency can be manufactured with a small number of steps.

A metal-plated carbon material according to an aspect of the disclosure includes: a carbon material; and a metal layer covering a surface of the carbon material, in which, in the metal layer, crystal grains forming the metal layer have an average crystal grain size of 110 nm or less.

In the above metal-plated carbon material, the metal layer is preferably made from one or more metals selected from the group consisting of palladium, copper, nickel, cobalt, gold, silver, and platinum.

A method of manufacturing a metal-plated carbon material according to another aspect of the disclosure, includes: a metal complex fixation step of immersing a carbon material in a supercritical fluid or subcritical fluid containing an organometallic complex of a first metal to form a metal-complex-fixed carbon material in which the organometallic complex is fixed to a surface of the carbon material; and a first energization deposition step of energizing the metal-complex-fixed carbon material in an electroless plating solution containing a second metal to decompose the organometallic complex of the first metal and deposit the second metal on the surface of the carbon material.

The method of manufacturing a metal-plated carbon material, preferably includes: a metal complex fixation step of immersing a carbon material in a supercritical fluid or subcritical fluid containing an organometallic complex of a first metal to form a metal-complex-fixed carbon material in which the organometallic complex is fixed to a surface of the carbon material; and a second energization deposition step of energizing the metal-complex-fixed carbon material in a conductive aqueous solution having conductivity of 100 µS/cm or more to decompose the organometallic complex of the first metal and deposit the first metal on the surface of the carbon material.

In the method of manufacturing a metal-plated carbon material, the first metal is preferably made from one or more metals selected from the group consisting of palladium, copper, nickel, cobalt, gold, silver, and platinum.

In the method of manufacturing a metal-plated carbon material, the second metal is preferably made from one or more metals selected from the group consisting of palladium, copper, nickel, cobalt, gold, silver, and platinum.

In the method of manufacturing a metal-plated carbon material, current density of energization in the energization deposition step is preferably 0.01 A/cm$^2$ or less.

According to the metal-plated carbon material and the manufacturing method thereof according to the present embodiment, it is possible to provide a metal-plated carbon material and a manufacturing method thereof, by which a metal-plated carbon material having high mechanical characteristics and high plating efficiency can be manufactured with a small number of steps.

DETAILED DESCRIPTION

Figure 1:
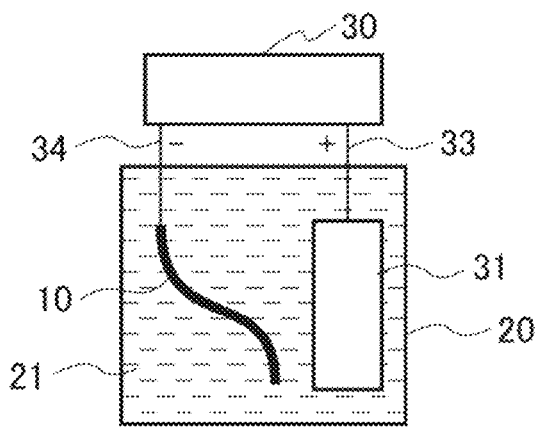
FIG. 1 illustrates first and second energization deposition steps.

Hereinafter, a metal-plated carbon material and a manufacturing method thereof according to an embodiment of the disclosure will be described in detail with reference to the drawings.

[Metal-Plated Carbon Material]

A metal-plated carbon material according to the embodiment includes a carbon material and a metal layer covering a surface of the carbon material.

(Carbon Material)

The carbon material for use in the metal-plated carbon material according to the embodiment is not particularly limited. Examples thereof encompass a carbon fiber, an aggregate thereof, a carbon nanotube twisted yarn, or an aggregate thereof. The carbon material may be, for example, a carbon material having a surface or inside into which a polar group is introduced by plasma treatment or electron beam irradiation treatment. The polar group is preferably introduced into the surface or inside of the carbon material because adhesion between the carbon material and the metal layer tends to be improved, and affinity with an aqueous solution containing metal ions is also improved.

Examples of a form of the carbon material encompass a fiber, cloth, and a plate. Specifically, the carbon material is, for example, a carbon fiber, carbon fiber cloth, or a carbon fiber plate.

(Metal Layer)

The metal layer for use in the metal-plated carbon material according to the embodiment is a film-like layer made from a highly conductive metal. The metal layer has a microscopic structure in which minute crystal grains made from the highly conductive metal closely adhere to each other.

In the metal layer, an average crystal grain size of the crystal grains forming the metal layer is 110 nm or less, preferably 30 to 100 nm, and more preferably 50 to 90 nm.

Herein, the average crystal grain size means a value $D_P$ calculated by applying, to the following expression (2), an average crystal grain cross-sectional area $A_{CS}$ calculated by the following expression (1) by using a TEM image of the metal layer.

[Math. 1]

$$\text{Average crystal grain cross-sectional area } A_{CS} = A_R/n_A \quad (1)$$

($A_R$: an area (nm$^2$) of a measurement rectangle $R_M$, which is a rectangle having an area of 100,000 nm$^2$ or more and is drawn on the TEM image of the metal layer, $n_A$: a sum $n_C+(n_P/2)$ of the number of crystal grains $n_C$ whose entire cross-sectional shape is included in the measurement rectangle $R_M$ and a half $n_P/2$ of the number of crystal grains $n_P$ whose cross-sectional shape is partially included in the measurement rectangle $R_M$.

[Math. 2]

$$\text{Average crystal grain size } D_P(\text{nm}) = (A_{CS})^{1/2} \quad (2)$$

In the expression (1), the wording "crystal grains whose entire cross-sectional shape is included in the measurement rectangle $R_M$" means crystal grains whose entire cross-sectional shape is included in the measurement rectangle $R_M$. In addition, the wording "crystal grains whose cross-sectional shape is partially included in the measurement rectangle $R_M$" means crystal grains whose cross-sectional shape is crossed by a side forming the measurement rectangle $R_M$.

As in the expression (1), $n_A=n_C+(n_P/2)$, and $n_A$ is a dimensionless number. For example, in a case where the number of crystal grains whose entire cross-sectional shape is included in the measurement rectangle $R_M$ is three ($=n_C$) and the number of crystal grains whose cross-sectional shape is crossed by a side forming the measurement rectangle $R_M$ is four ($=n_P$) in the TEM image of the metal layer, $n_A=3+(4/2)=5$ is satisfied.

The average crystal grain size $D_P$ of the crystal grains forming the metal layer preferably falls within the above range because the adhesion between the metal layer and the carbon material is high.

The metal layer is made from, for example, one or more metals selected from the group consisting of palladium, copper, nickel, cobalt, gold, silver, and platinum. The metal forming the metal layer is preferably made from the above one or more metals because conductivity of the metal layer is high, and the adhesion with the carbon material is also high.

In the metal layer, the metal forming the metal layer is preferably copper, nickel, gold, silver, and the like. In a case where the metal forming the metal layer is any of those metals, the conductivity of the metal layer is improved, and the adhesion with the carbon material is also improved.

The metal layer has a thickness of, for example, 0.05 to 1 μm, and preferably 0.1 to 0.5 μm. The thickness of the metal layer is calculated by enlarging a sample having a polished cross-section by using an SEM or the like having a dimension measuring function. The thickness of the metal layer preferably falls within the above range because the conductivity of the metal layer is high, and plating is not distorted too much at the time of bending and cracking of the plating hardly occurs.

(Effects)

According to the metal-plated carbon material according to the embodiment, it is possible to manufacture a metal-plated carbon material having high mechanical characteristics and high plating efficiency with a small number of steps.

Further, according to the metal-plated carbon material according to the embodiment, the adhesion between the metal layer and the carbon material is high because the average crystal grain size $D_P$ of the crystal grains forming the metal layer falls within the above range.

[Method of Manufacturing Metal-Plated Carbon Material]

There are two types of methods of manufacturing a metal-plated carbon material according to the embodiment, i.e., a first manufacturing method and a second manufacturing method. The first manufacturing method is a manufacturing method including a metal complex fixation step and a first energization deposition step. The second manufacturing method is a manufacturing method including a metal complex fixation step and a second energization deposition step. Hereinafter, the first manufacturing method and the second manufacturing method will be described.

[First Manufacturing Method]

The first manufacturing method includes a metal complex fixation step and a first energization deposition step.

(Metal Complex Fixation Step)

The metal complex fixation step is common to the first manufacturing method and the second manufacturing method.

The metal complex fixation step is a step of immersing a carbon material in a supercritical fluid or subcritical fluid containing an organometallic complex of a first metal, thereby fixing the organometallic complex to a surface of the carbon material to form a metal-complex-fixed carbon material.

<Carbon Material>

The carbon material for use in this step is the same as the carbon material described in the description of the metal-plated carbon material according to the embodiment.

<Organometallic Complex of First Metal>

The organometallic complex of the first metal is an organometallic complex that is to be fixed to the surface of the carbon material, thereby forming a metal-complex-fixed carbon material. Herein, the first metal means a metal included in the organometallic complex for use in this step. The first metal generally serves as a catalytic metal for plating a second metal described later. Herein, the second metal means a metal contained in an electroless plating solution for use in an energization deposition step described later. Note that the first metal and the second metal may be different or the same.

[First Metal]

The first metal is made from, for example, one or more metals selected from the group consisting of palladium, copper, nickel, cobalt, gold, silver, and platinum. The first metal is preferably made from the above metals because the adhesion between the metal layer and the carbon material is high and a satisfactory metal layer can be formed in the subsequent energization deposition step.

The first metal is preferably palladium, nickel, or the like. The first metal is preferably any of those metals because the adhesion between the metal layer and the carbon material is higher and a more satisfactory metal layer can be formed in the subsequent energization deposition step.

[Ligand]

A ligand forming the organometallic complex of the first metal is not particularly limited. For example, the ligand is one or more organic substances selected from the group consisting of β-diketonates, dienes, and metallocenes. Among those, hexafluoroacetylacetonates are preferable because hexafluoroacetylacetonates have satisfactory solubility and diffusibility in the supercritical fluid and can be easily released from a metal element by energization.

<Supercritical Fluid or Subcritical Fluid>

In this step, the carbon material is immersed in the supercritical fluid or subcritical fluid containing the organometallic complex of the first metal. Herein, the supercritical fluid or subcritical fluid is, for example, a fluid containing one or more substances selected from the group consisting of carbon dioxide, dinitrogen monoxide, trifluoromethane, hexafluoroethane, methane, ethane, and ethylene. The supercritical fluid or subcritical fluid is preferably any of the above substances because diffusibility and permeability into the carbon material are high and the supercritical fluid or subcritical fluid is efficiently and uniformly brought into contact with the surface of the carbon material.

The supercritical fluid or subcritical fluid is preferably carbon dioxide. The supercritical fluid or subcritical fluid is preferably the above substance because the diffusibility and permeability into the carbon material are higher and the supercritical fluid or subcritical fluid is more efficiently and uniformly brought into contact with the surface of the carbon material.

The supercritical fluid or subcritical fluid has a temperature of, for example, 35 to 200° C., and preferably 125 to 150° C. The temperature of the supercritical fluid or subcritical fluid preferably falls within the above range because the organometallic complex of the first metal is easily fixed to the surface of the carbon material.

An amount of the organometallic complex of the first metal in the supercritical fluid or subcritical fluid is, for example, 0.05 to 5% by mass, and preferably 0.5 to 1.5% by mass with respect to the mass of the carbon material. The amount of the organometallic complex of the first metal preferably falls within the above range because the organometallic complex of the first metal is easily fixed to the surface of the carbon material.

<Immersion>

In this step, the carbon material is immersed in the supercritical fluid or subcritical fluid containing the organometallic complex of the first metal. Immersion time is, for example, 10 to 120 minutes, and preferably 30 to 60 minutes. The immersion time preferably falls within the above range because the organometallic complex of the first metal is easily fixed to the surface of the carbon material.

In this step, when the carbon material is immersed in the supercritical fluid or subcritical fluid containing the organometallic complex of the first metal, a metal-complex-fixed carbon material in which the organometallic complex is fixed to the surface of the carbon material is obtained. In the metal-complex-fixed carbon material, the organometallic complex is fixed to the surface of the carbon material. Herein, fixation means that the organometallic complex of the first metal adheres to the surface of the carbon material while the organometallic complex of the first metal is not being chemically changed.

The metal-complex-fixed carbon material contains, for example, 0.01 parts by mass or more, and preferably 0.03 parts by mass or more of the organometallic complex of the first metal with respect to 100 parts by mass of the carbon material. An amount of fixation of the organometallic complex of the first metal to the metal-complex-fixed carbon material preferably falls within the above range. This is because distribution of the organometallic complex of the first metal on a surface of the material becomes dense, the second metal is easily deposited, and adhesion of the second metal to the carbon material is improved.

(First Energization Deposition Step)

Next, the first energization deposition step will be described. The first energization deposition step is a step of energizing the metal-complex-fixed carbon material in an electroless plating solution containing the second metal, thereby decomposing the organometallic complex of the first metal and depositing the second metal on the surface of the carbon material. At least the second metal needs to be deposited in the first energization deposition step, but the first metal may also be deposited. In the first energization deposition step, the organometallic complex of the first metal is generally decomposed and reduced to the first metal, and thus not only the second metal but also the first metal is deposited.

<Electroless Plating Solution Containing Second Metal>

The electroless plating solution containing the second metal means an electroless plating solution capable of depositing the second metal on the surface of the carbon material or a surface of the first metal on the carbon material without energization. Herein, the second metal means a metal contained in the electroless plating solution for use in this step. Further, the first metal means a metal included in the organometallic complex for use in the above metal complex fixation step. The second metal and the first metal may be different or the same.

The electroless plating solution containing the second metal contains a reducing agent such as formaldehyde and hypophosphite. The first metal serves as a catalyst and promotes a reduction—oxidation reaction between the reducing agent and the second metal, thereby depositing the second metal. Therefore, the electroless plating solution containing the second metal is a plating solution capable of depositing the second metal on the surface of the metal-complex-fixed carbon material or the carbon material without energization. The electroless plating solution containing the second metal can be obtained by, for example, selecting the kind of ions of the second metal and the kind of ligands coordinated with the ions of the second metal or adjusting concentration of the ions of the second metal and the ligands thereof.

[Second Metal]

The second metal is made from, for example, one or more metals selected from the group consisting of palladium, copper, nickel, cobalt, gold, silver, and platinum. The second metal is preferably made from the above metals because the conductivity of the carbon material can be improved.

The second metal is preferably copper, gold, silver, nickel, or the like. The second metal is preferably any of those metals because the conductivity of the carbon material can be significantly improved.

[Ligand]

The ligand forming the electroless plating solution containing the second metal is not particularly limited. For example, the ligand is ethylenediaminetetraammineacetic acid (EDTA), thiourea, diethylenetriaminepentaacetic acid, or potassium sodium tartrate. Among those, ethylenediaminetetraammineacetic acid (EDTA) is preferable because EDTA forms a stable complex with the second metal in a wide temperature range and is applicable to various electroless plating solutions.

Concentration of the second metal contained in the electroless plating solution containing the second metal is, for example, 0.015 to 0.065 mol/L, and preferably 0.020 to 0.056 mol/L. The concentration of the second metal preferably falls within the above range because uniform plating can be obtained, and the second metal is not abnormally deposited in a plating tank and a continuous plating process can be stably performed.

The electroless plating solution containing the second metal can originally deposit the second metal on the surface of the metal-complex-fixed carbon material or the carbon material without energization. However, in this step, the metal-complex-fixed carbon material is energized in the electroless plating solution containing the second metal. Therefore, in this step, it is possible to generally decompose the organometallic complex of the first metal fixed to the carbon material and reduce the organometallic complex to the first metal, and also deposit the second metal on the surface of the carbon material.

In a case where the first metal and the second metal are deposited in this step, it is possible to control amounts of deposition of the first metal and the second metal by adjusting an energization condition or the like. In this step, energization is generally performed under the condition that the amount of deposition of the second metal is larger than that of the first metal. For this reason, the metal layer of the metal-plated carbon material obtained after this step is mainly made from the second metal.

Current density of energization in this step is generally 0.01 A/cm$^2$ or less, and preferably 0.0001 to 0.005 A/cm$^2$. The current density of energization preferably falls within the above range because the organometallic complex of the first metal can be efficiently decomposed, whereas the amount of deposition of the second metal can be increased.

Meanwhile, when the current density of energization in this step exceeds 0.01 A/cm$^2$, rapid consumption of the ions of the second metal in the vicinity of the surface of the carbon material causes electrolysis of water, and, due to oxygen generated by this electrolysis, metal oxide of the second metal tends to be generated. For this reason, it is not preferable that the current density of energization in this step exceed 0.01 A/cm$^2$ because the amount of deposition of the second metal tends to be decreased.

FIG. 1 illustrates the first energization deposition step. As illustrated in FIG. 1, there is used, in the first energization deposition step, an apparatus including an energization treatment tank 20, a metal-complex-fixed carbon material 10 and an electrode 31 arranged in the energization treatment tank 20, and a power supply 30 connected to the metal-complex-fixed carbon material 10 and the electrode 31. The energization treatment tank 20 is filled with an electroless plating solution 21 as an energization treatment solution, and the metal-complex-fixed carbon material 10 and the electrode 31 are immersed in the electroless plating solution 21. The electrode 31 is connected to a positive electrode of the power supply 30 via a positive electrode conductor 33, and the metal-complex-fixed carbon material 10 is connected to a negative electrode of the power supply 30 via a negative electrode conductor 34.

With this configuration, in a case where the power supply 30 is turned on, the metal-complex-fixed carbon material 10 becomes negative in the electroless plating solution 21. Therefore, in a case where the power supply 30 is turned on, the organometallic complex of the first metal fixed to a surface of the metal-complex-fixed carbon material 10 is decomposed and reduced to the first metal. Further, in a case where the power supply 30 is turned on, the ions of the second metal in the electroless plating solution 21 are deposited as the second metal on the surface of the carbon material exposed by decomposition of the organometallic complex of the first metal and the surface of the first metal reduced by the decomposition.

When all steps of the first manufacturing method are terminated, a metal-plated carbon material having a metal layer in which a layer made from the first metal and a layer made from the second metal are formed in this order on the surface of the carbon material is obtained.

(Effects)

According to the first method of manufacturing a metal-plated carbon material according to the embodiment, it is possible to manufacture a metal-plated carbon material having high mechanical characteristics and high plating efficiency with a small number of steps.

[Second Manufacturing Method]

The second manufacturing method includes a metal complex fixation step and a second energization deposition step. The metal complex fixation step of the second manufacturing method is the same as the metal complex fixation step of the first manufacturing method, and thus description thereof is omitted.

(Second Energization Deposition Step)

Next, the second energization deposition step will be described. The second energization deposition step is a step of energizing the metal-complex-fixed carbon material in a conductive aqueous solution having conductivity of 100 μS/cm or more, thereby decomposing the organometallic complex of the first metal and depositing the first metal on the surface of the carbon material.

<Conductive Aqueous Solution Having Conductivity of 100 μS/Cm or More>

The conductive aqueous solution having the conductivity of 100 μS/cm or more is an aqueous solution having conductivity of 100 μS/cm or more, and is not particularly limited. Examples of the conductive aqueous solution having the conductivity of 100 μS/cm or more encompass a sodium sulfate aqueous solution, a sodium chloride aqueous solution, sulfuric acid, and a sodium hydroxide aqueous solution. In a case where the electroless plating solution containing the second metal in the first manufacturing method has the conductivity of 100 μS/cm or more, this electroless plating solution containing the second metal also serves as the conductive aqueous solution having the conductivity of 100 μS/cm or more in the second manufacturing method.

In a case where the conductive aqueous solution having the conductivity of 100 μS/cm or more contains metal ions, this metal will also be referred to as "third metal" hereinafter. The third metal is the same as, for example, the second metal in the first manufacturing method.

The third metal is preferably the same material as the first metal because a satisfactory metal layer having a uniform composition can be formed.

The conductive aqueous solution having the conductivity of 100 μS/cm or more may contain not only the third metal but also a ligand coordinated with the third metal. This ligand can be the same as the ligand contained in the electroless plating solution containing the second metal in the first manufacturing method. For this reason, description of the ligand is omitted.

In this step, the metal-complex-fixed carbon material is energized in the conductive aqueous solution having the conductivity of 100 μS/cm or more. Therefore, in this step, it is possible to generally decompose the organometallic complex of the first metal fixed to the carbon material and reduce the organometallic complex to the first metal. In a case where the third metal is contained in the conductive aqueous solution, it is possible to decompose the organometallic complex of the first metal fixed to the carbon material and reduce the organometallic complex to the first metal, and also reduce the third metal and deposit the third metal on the surface of the carbon material.

In a case where the first metal and the third metal are deposited in this step, it is possible to control amounts of deposition of the first metal and the third metal by adjusting an energization condition or the like.

Current density of energization in this step is generally 0.01 A/cm² or less, and preferably 0.0001 to 0.005 A/cm². The current density of energization preferably falls within the above range because the organometallic complex of the first metal tends to be efficiently decomposed.

In the case where the conductive aqueous solution having the conductivity of 100 μS/cm or more contains the third metal, the current density of energization in this step is generally 0.01 A/cm² or less, and preferably 0.0002 to 0.005 A/cm². The current density of energization preferably falls within the above range because the organometallic complex of the first metal can be efficiently decomposed, whereas the amount of deposition of the third metal can be increased.

Meanwhile, in the case where the conductive aqueous solution having the conductivity of 100 μS/cm or more contains the third metal and when the current density of energization in this step exceeds 0.01 A/cm², the following problem arises. Specifically, rapid consumption of the third metal ions in the vicinity of the surface of the carbon material causes electrolysis of water, and, due to oxygen generated by this electrolysis, metal oxide of the third metal tends to be generated. For this reason, it is not preferable that the current density of energization in this step exceed 0.01 A/cm² because the amount of deposition of the third metal tends to be decreased.

FIG. 1 illustrates the second energization deposition step. As illustrated in FIG. 1, there is used, in the first energization deposition step, an apparatus including an energization treatment tank 20, a metal-complex-fixed carbon material 10 and an electrode 31 arranged in the energization treatment tank 20, and a power supply 30 connected to the metal-complex-fixed carbon material 10 and the electrode 31. The energization treatment tank 20 is filled with a conductive aqueous solution 21 having conductivity of 100 μS/cm or more as the energization treatment solution, and the metal-complex-fixed carbon material 10 and the electrode 31 are immersed in the conductive aqueous solution 21. The electrode 31 is connected to a positive electrode of the power supply 30 via a positive electrode conductor 33, and the metal-complex-fixed carbon material 10 is connected to a negative electrode of the power supply 30 via a negative electrode conductor 34.

With this configuration, in a case where the power supply 30 is turned on, the metal-complex-fixed carbon material 10 becomes negative in the conductive aqueous solution 21. Therefore, in a case where the power supply 30 is turned on, the organometallic complex of the first metal fixed to a surface of the metal-complex-fixed carbon material 10 is decomposed and reduced to the first metal. Further, in a case where the conductive aqueous solution 21 contains the third metal and when the power supply 30 is turned on, ions of the third metal in the conductive aqueous solution 21 are deposited as the third metal on the surface of the carbon material exposed by decomposition of the organometallic complex of the first metal and the surface of the first metal reduced by the decomposition.

When all steps of the second manufacturing method are terminated, a metal-plated carbon material having a metal layer made from the first metal on the surface of the carbon material is generally obtained. In a case where the conductive aqueous solution contains the third metal and when all the steps of the second manufacturing method are terminated, a metal-plated carbon material having a metal layer in which a layer made from the first metal and a layer made from the third metal are formed in this order on the surface of the carbon material is obtained. As described above, the first metal and the third metal may be the same as or different.

(Effects)

According to the second method of manufacturing a metal-plated carbon material according to the embodiment, it is possible to manufacture a metal-plated carbon material having high mechanical characteristics and high plating efficiency with a small number of steps.

[Modification Example of Second Manufacturing Method]

The second manufacturing method may be a modification example in which an electroless plating step is further provided after the second energization deposition step. The electroless plating step performed in the modification example of the second manufacturing method is a step of performing electroless plating on a first-metal-deposited carbon material obtained in the second energization deposition step, the first-metal-deposited carbon material being a carbon material having a surface on which the first metal is deposited. The electroless plating step is not particularly limited. For example, the step is similar to the first energization deposition step of the first manufacturing method, except that energization is not performed.

In a case where the electroless plating step is performed after the second energization deposition step, generally, a metal-plated carbon material having a metal layer in which a layer made from the first metal and a layer made from the second metal contained in the electroless plating solution are formed in this order on the surface of the carbon material is obtained. Further, in a case where the conductive aqueous solution contains the third metal and when the electroless plating step is performed after the second energization deposition step, a metal-plated carbon material having a metal layer including a layer made from the first metal, a layer made from the third metal, and a layer made from the second metal is obtained. Specifically, a metal-plated carbon material having a metal layer in which a layer made from the first metal, a layer made from the third metal, and a layer made from the second metal are formed in this order on the surface of the carbon material is obtained. The first metal, the second metal, and the third metal may be the same, or all or part of those metals may be different.

(Effects)

According to the second method of manufacturing a metal-plated carbon material according to the embodiment, it is possible to manufacture a metal-plated carbon material having high mechanical characteristics and high plating efficiency with a small number of steps.

EXAMPLES

Hereinafter, the disclosure will be described in more detail by using examples and comparative examples. However, the disclosure is not limited to those examples.

Example 1

(Metal Complex Fixation Step)

Twelve thousand (12,000) of carbon fibers having a diameter of 7 μm and a length of 20 m were prepared. A powdery organopalladium complex (substance name: palladium (II) hexafluoroacetylacetonate) was prepared as the organometallic complex of the first metal. Supercritical carbon dioxide was prepared as the supercritical fluid.

The organopalladium complex was added to the carbon fibers placed on a table in a reactor so as to be 1.4% by mass with respect to the mass of the carbon fibers. Then, super-critical carbon dioxide was introduced into the reactor, and treatment was performed for 30 minutes while a temperature inside the reactor was maintained at 130° C. and pressure thereinside was maintained at 15 MPa. Thus, a metal-complex-fixed carbon material in which the organopalladium complex was fixed to surfaces of the carbon fibers was obtained.

(First Energization Deposition Step)

An electroless plating solution containing copper (composition: ethylenediaminetetraammineacetic acid (EDTA), copper sulfate, sodium hydroxide, formaldehyde, and pure water) was adjusted to have 43 to 50° C. The metal-complex-fixed carbon material and an electrode were immersed in this electroless plating solution, and were energized for 1 minute at the current density of 0.0002 A/cm². As a result, a metal-plated carbon material (Sample No. A-11) having a metal layer in which a palladium layer and a copper layer were formed in this order on the surfaces of the carbon fibers was obtained.

(Electroless Plating Step)

Electroless copper plating was further performed on the above metal-plated carbon material (Sample No. A-11). Specifically, an electroless plating solution containing copper (composition: ethylenediaminetetraammineacetic acid (EDTA), copper sulfate, sodium hydroxide, formaldehyde, and pure water) was adjusted to have 43 to 50° C. The metal-plated carbon material was immersed in this electroless plating solution and was left for 9 minutes. As a result, a metal-plated carbon material (Sample No. A-12) having a metal layer in which a palladium layer and a thick copper layer were formed in this order on the surfaces of the carbon fibers was obtained.

(Surface Chemical State Analysis)

Figure 2:
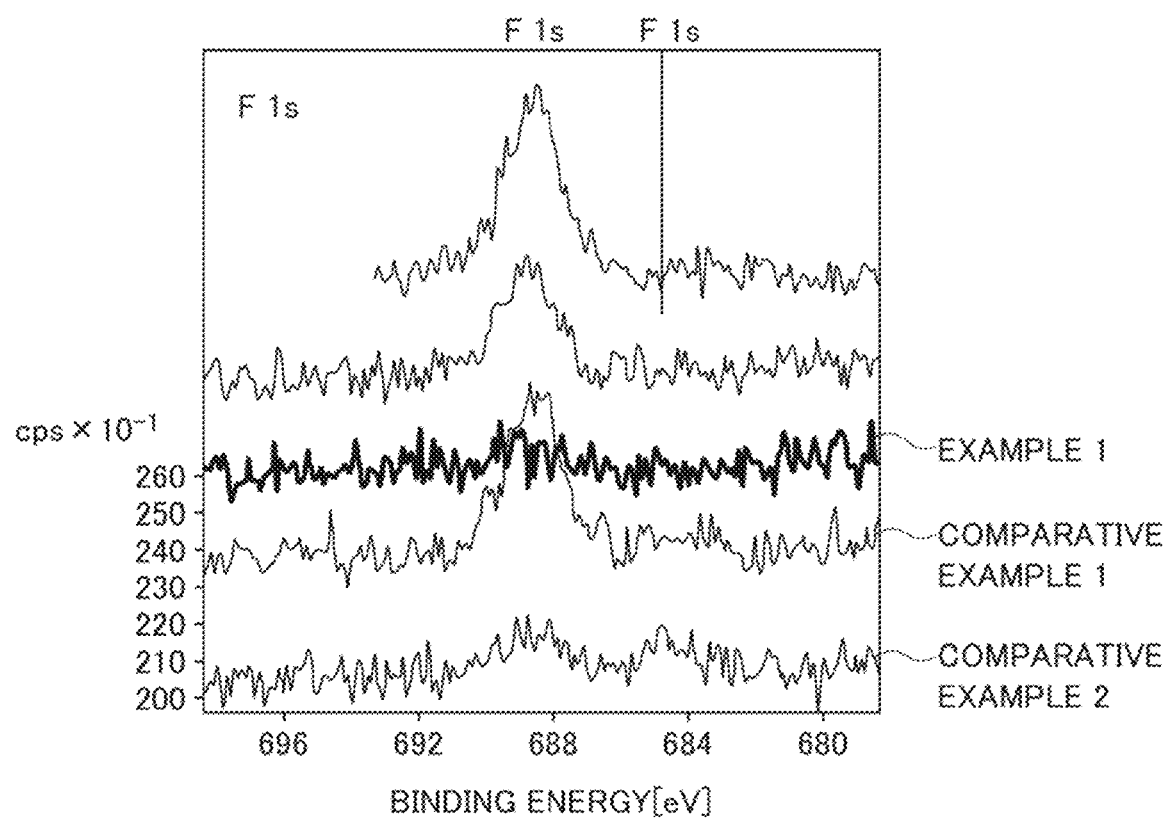
FIG. 2 is a graph of fluorine F in surface chemical state analysis (XPS) of a metal-plated carbon material.
Figure 3:
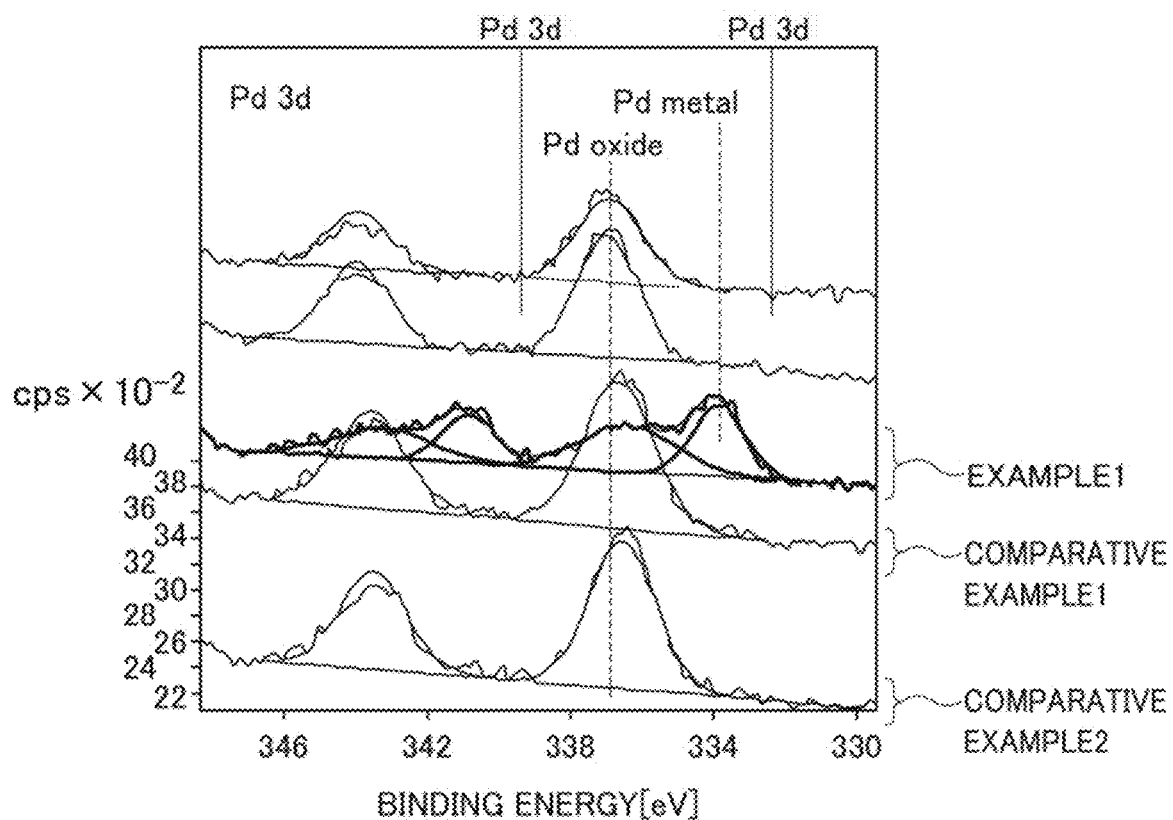
FIG. 3 is a graph of palladium Pd in surface chemical state analysis (XPS) of a metal-plated carbon material.

A chemical state of a surface of the resultant metal-plated carbon material (Sample No. A-12) was analyzed by X-ray photoelectron spectroscopy (XPS). A result thereof is illustrated in FIGS. 2 and 3. FIG. 2 is a graph of fluorine F in surface chemical state analysis (XPS) of the metal-plated carbon material. FIG. 3 is a graph of palladium Pd in surface chemical state analysis (XPS) of the metal-plated carbon material.

It was found from FIG. 2 that there was no peak of fluorine F in the vicinity of 689 eV in Example 1. That is, it was found that the organopalladium complex was decomposed in Example 1.

It was found from FIG. 3 that, in Example 1, there was no peak of palladium oxide in the vicinity of 337 eV, but there was a peak of metal palladium in the vicinity of 334 eV. That is, it was found that the palladium layer in the metal layer was made from metal palladium in Example 1.

(Cross-Sectional TEM Analysis)

Figure 4:
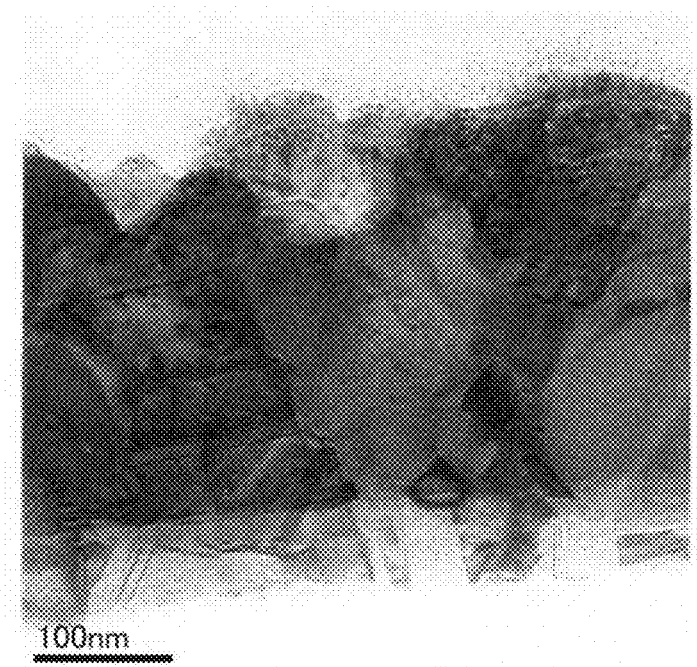
FIG. 4 illustrates a result of cross-sectional TEM (transmission electron microscope) observation of a metal-plated carbon material in Example 1.
Figure 5:
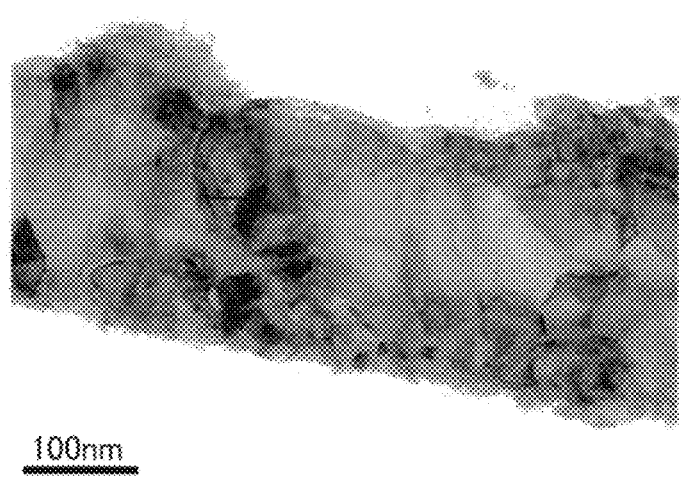
FIG. 5 illustrates a result of cross-sectional TEM (transmission electron microscope) observation of another part of the metal-plated carbon material in Example 1.

A cross section of the resultant fibrous metal-plated carbon material (Sample No. A-12) cut along a longitudinal direction of the fibers was observed by using a transmission electron microscope (TEM). A result thereof is illustrated in FIGS. 4 and 5. FIG. 4 illustrates a result of cross-sectional TEM (transmission electron microscope) observation of the metal-plated carbon material of Example 1. FIG. 5 illustrates a result of cross-sectional TEM (transmission electron microscope) observation of another part of the metal-plated carbon material of Example 1.

The average crystal grain cross-sectional area $A_{CS}$ (nm²) and the average crystal grain size $D_P$ (nm) were calculated from FIGS. 4 and 5 and the expressions (1) and (2). The average crystal grain cross-sectional area $A_{CS}$ was calculated to be 3160 to 6910 (nm²), and the average crystal grain size $D_P$ was calculated to be 56 to 83 (nm).

(Amount of Copper Deposition)

Figure 7:
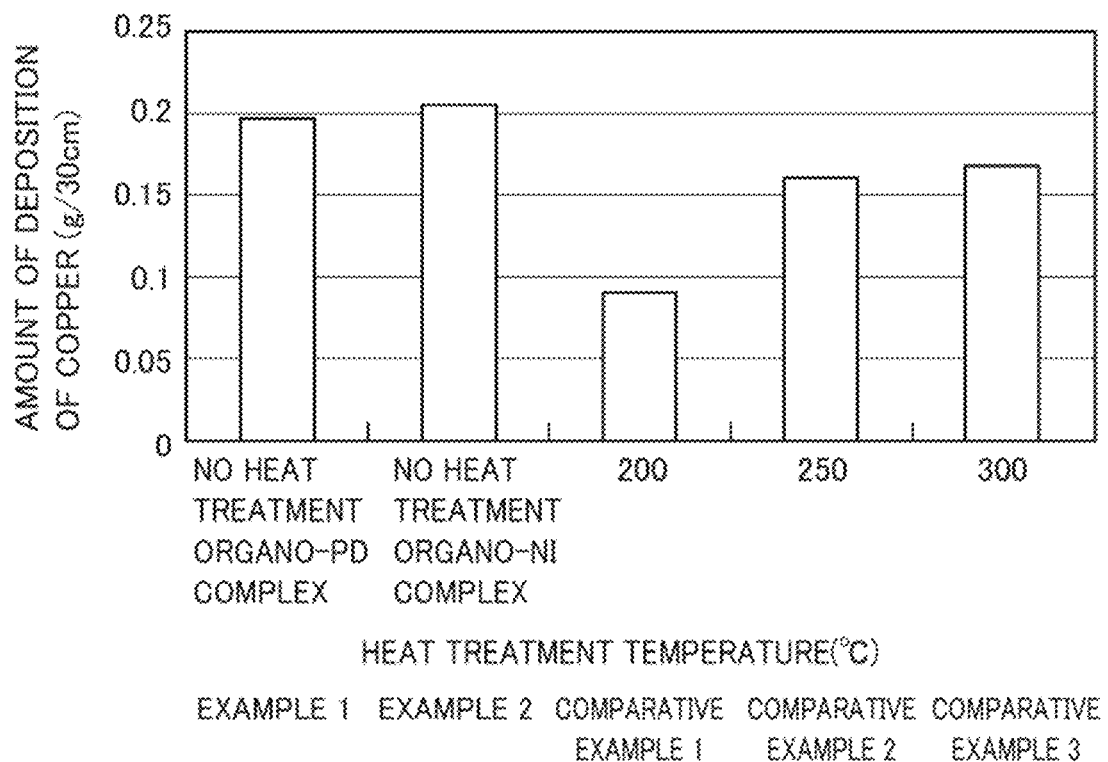
FIG. 7 is a graph of an amount of deposition of copper on a copper layer forming a metal-plated carbon material.

An amount of deposition of copper on the copper layer of the resultant metal-plated carbon material (Sample No. A-12) was measured. A result thereof is illustrated in FIG. 7.

(Bending Resistance)

Figure 8:
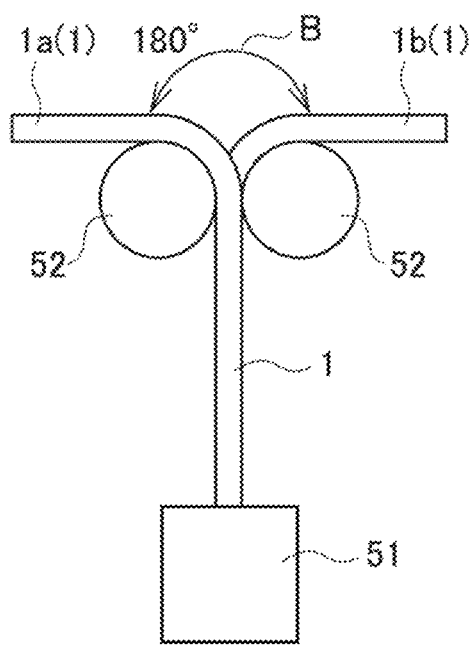
FIG. 8 is a schematic diagram of a bending test.
Figure 9:
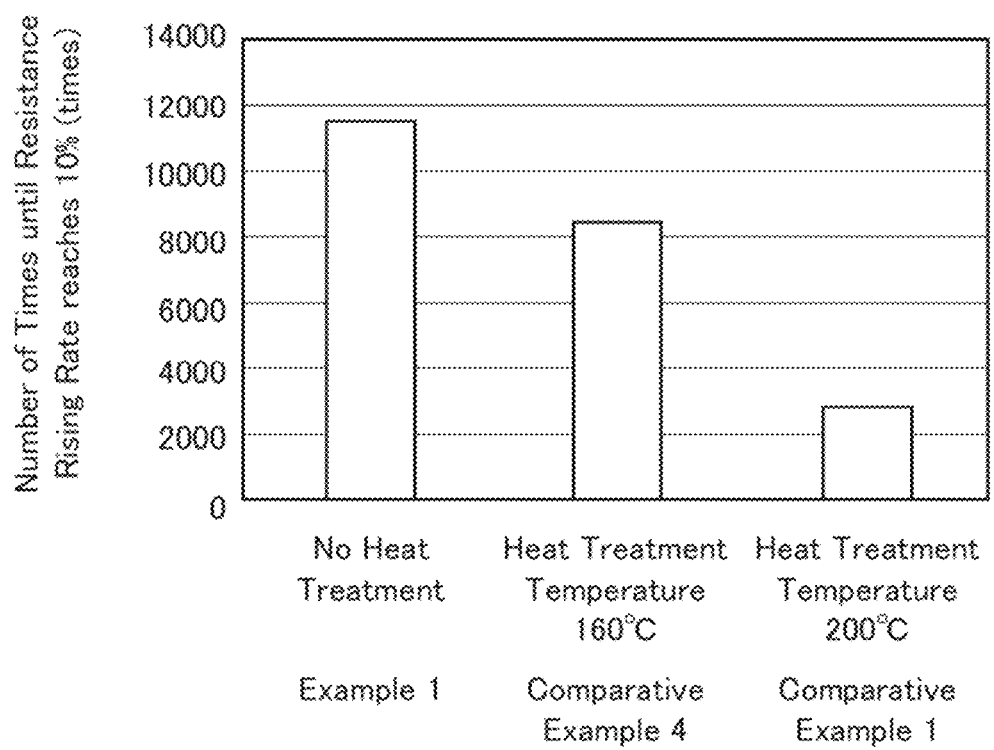
FIG. 9 is a graph of the number of times until a resistance rising rate of a metal-plated carbon material reaches 10%.

Bending resistance of the resultant metal-plated carbon material (Sample No. A-12) was measured. The bending resistance was measured by using a measuring apparatus illustrated in FIG. 8. The bending resistance was measured as follows. First, an upper part of a metal-plated carbon material 1 was sandwiched between a pair of mandrels 52 and 52 of φ2 mm while a weight 51 of 200 g was being suspended from a lower part of the metal-plated carbon material 1. Then, the upper part of the metal-plated carbon material 1 was bent along a surface of the mandrel 52 so as to be 180° of opening B of bending angle between a state of a metal-plated carbon material 1a and a state of a metal-plated carbon material 1b. Then, the number of times of bending required until a resistance value of the metal-plated carbon material 1 was increased by 10% from the beginning was calculated as the number of times until resistance rising rate reaches 10% (times). A result thereof is illustrated in FIG. 9.

Example 2

(Metal Complex Fixation Step)

Twelve thousand (12,000) of carbon fibers having a diameter of 7 μm and a length of 20 m were prepared. A powdery organonickel complex (substance name: nickel (II) hexafluoroacetylacetonate) was prepared as the organometallic complex of the first metal. Supercritical carbon dioxide was prepared as the supercritical fluid.

The organonickel complex was added to the carbon fibers placed on a table in a reactor so as to be 2.8% by mass with respect to the mass of the carbon fibers. Then, supercritical carbon dioxide was introduced into the reactor, and treatment was performed for 30 minutes while a temperature inside the reactor was maintained at 130° C. and pressure thereinside was maintained at 15 MPa. Thus, a metal-complex-fixed carbon material in which the organonickel complex was fixed to surfaces of the carbon fibers was obtained.

(First Energization Deposition Step)

An electroless plating solution containing copper (composition: ethylenediaminetetraammineacetic acid (EDTA), copper sulfate, sodium hydroxide, formaldehyde, and pure water) was adjusted to have 43 to 50° C. The metal-complex-fixed carbon material and an electrode were immersed in this electroless plating solution, and were energized for 1 minute at the current density of 0.0002 A/cm². As a result, a metal-plated carbon material having a metal layer in which a nickel layer and a copper layer were formed in this order on the surfaces of the carbon fibers was obtained.

(Electroless Plating Step)

Electroless copper plating was further performed on the above metal-plated carbon material.

Specifically, an electroless plating solution containing copper (composition: ethylenediaminetetraammineacetic acid (EDTA), copper sulfate, sodium hydroxide, formaldehyde, and pure water) was adjusted to have 43 to 50° C. The metal-plated carbon material was immersed in this electroless plating solution and was left for 9 minutes. As a result, a metal-plated carbon material having a metal layer in which a nickel layer and a thick copper layer were formed in this order on the surfaces of the carbon fibers was obtained.

(Amount of Copper Deposition)

An amount of deposition of copper on the copper layer of the resultant metal-plated carbon material was measured. A result thereof is illustrated in FIG. 7.

Comparative Example 1

(Metal Complex Fixation Step)

A metal-complex-fixed carbon material in which the organopalladium complex was fixed to the surfaces of the carbon fibers was obtained in the same way as the metal complex fixation step of Example 1.

(Heat Treatment Step)

The metal-complex-fixed carbon material in which the organopalladium complex was fixed to the surfaces of the carbon fibers was left for 60 minutes at 200° C. Thus, an after heat treatment-carbon material was obtained.

(First Energization Deposition Step)

An electroless plating solution containing copper (composition: ethylenediaminetetraammineacetic acid (EDTA), copper sulfate, sodium hydroxide, formaldehyde, and pure water) was adjusted to have 43 to 50° C. The metal-complex-fixed carbon material and an electrode were immersed in this electroless plating solution, and were energized for 1 minute at the current density of 0.0002 A/cm². As a result, a metal-plated carbon material having a metal layer in which a palladium layer and a copper layer were formed in this order on the surfaces of the carbon fibers was obtained.

(Electroless Plating Step)

An electroless plating solution containing copper (composition: ethylenediaminetetraammineacetic acid (EDTA), copper sulfate, sodium hydroxide, formaldehyde, and pure water) was adjusted to have 43 to 50° C. The after heat treatment-carbon material was immersed in this electroless plating solution and was left for 9 minutes. As a result, a metal-plated carbon material having a metal layer in which a palladium layer and a copper layer were formed in this order on the surfaces of the carbon fibers was obtained.

(Surface Chemical State Analysis)

A chemical state of a surface of the resultant metal-plated carbon material was analyzed by X-ray photoelectron spectroscopy (XPS) in the same way as in Example 1. A result thereof is illustrated in FIGS. 2 and 3.

It was found from FIG. 2 that there was a peak of fluorine F in the vicinity of 689 eV in Comparative Example 1. That is, it was found that the organopalladium complex was not decomposed but remained in Comparative Example 1.

It was found from FIG. 3 that, in Comparative Example 1, there was a peak of palladium oxide in the vicinity of 337 eV, but there was no peak of metal palladium in the vicinity of 334 eV. That is, it was found that, in Comparative Example 1, the palladium layer in the metal layer was made not from metal palladium, but from palladium oxide.

(Amount of Copper Deposition)

An amount of deposition of copper on the copper layer of the resultant metal-plated carbon material was measured. A result thereof is illustrated in FIG. 7.

(Bending Resistance)

Bending resistance of the resultant metal-plated carbon material was measured in the same way as in Example 1. A result thereof is illustrated in FIG. 9.

Comparative Example 2

(Metal Complex Fixation Step)

A metal-complex-fixed carbon material in which the organopalladium complex was fixed to the surfaces of the carbon fibers was obtained in the same way as the metal complex fixation step of Example 1.

(Heat Treatment Step)

The metal-complex-fixed carbon material in which the organopalladium complex was fixed to the surfaces of the carbon fibers was left for 60 minutes at 250° C. Thus, an after heat treatment-carbon material was obtained.

(First Energization Deposition Step)

An electroless plating solution containing copper (composition: ethylenediaminetetraammineacetic acid (EDTA), copper sulfate, sodium hydroxide, formaldehyde, and pure water) was adjusted to have 43 to 50° C. The metal-complex-fixed carbon material and an electrode were immersed in this electroless plating solution, and were energized for 1 minute at the current density of 0.0002 A/cm$^2$. As a result, a metal-plated carbon material having a metal layer in which a palladium layer and a copper layer were formed in this order on the surfaces of the carbon fibers was obtained.

(Electroless Plating Step)

An electroless plating solution containing copper (composition: ethylenediaminetetraammineacetic acid (EDTA), copper sulfate, sodium hydroxide, formaldehyde, and pure water) was adjusted to have 43 to 50° C. The after heat treatment-carbon material was immersed in this electroless plating solution and was left for 9 minutes. As a result, a metal-plated carbon material having a metal layer in which a palladium layer and a copper layer were formed in this order on the surfaces of the carbon fibers was obtained.

(Surface Chemical State Analysis)

A chemical state of a surface of the resultant metal-plated carbon material was analyzed by X-ray photoelectron spectroscopy (XPS) in the same way as in Example 1. A result thereof is illustrated in FIGS. 2 and 3.

It was found from FIG. 2 that there was substantially no peak of fluorine F in the vicinity of 689 eV in Comparative Example 2. That is, it was found that the organopalladium complex was substantially decomposed in Comparative Example 2.

It was found from FIG. 3 that, in Comparative Example 2, there was a peak of palladium oxide in the vicinity of 337 eV, but there was no peak of metal palladium in the vicinity of 334 eV. That is, it was found that, in Comparative Example 2, the palladium layer in the metal layer was made not from metal palladium, but from palladium oxide.

The following were found from FIGS. 2 and 3. That is, it was found that, in Example 1, the organopalladium complex was decomposed, and the palladium layer in the metal layer was made from metal palladium. It was found that, in Comparative Example 1, the organopalladium complex was not decomposed but remained, and the palladium layer in the metal layer was made from palladium oxide. It was found that, in Comparative Example 2, the organopalladium complex was substantially decomposed, and the palladium layer in the metal layer was made from palladium oxide.

(Amount of Copper Deposition)

An amount of deposition of copper on the copper layer of the resultant metal-plated carbon material was measured. A result thereof is illustrated in FIG. 7.

Comparative Example 3

(Metal Complex Fixation Step)

A metal-complex-fixed carbon material in which the organopalladium complex was fixed to the surfaces of the carbon fibers was obtained in the same way as the metal complex fixation step of Example 1.

(Heat Treatment Step)

The metal-complex-fixed carbon material in which the organopalladium complex was fixed to the surfaces of the carbon fibers was left for 60 minutes at 300° C. Thus, an after heat treatment-carbon material was obtained.

(First Energization Deposition Step)

An electroless plating solution containing copper (composition: ethylenediaminetetraammineacetic acid (EDTA), copper sulfate, sodium hydroxide, formaldehyde, and pure water) was adjusted to have 43 to 50° C. The metal-complex-fixed carbon material and an electrode were immersed in this electroless plating solution, and were energized for 1 minute at the current density of 0.0002 A/cm$^2$. As a result, a metal-plated carbon material having a metal layer in which a palladium layer and a copper layer were formed in this order on the surfaces of the carbon fibers was obtained.

(Electroless Plating Step)

An electroless plating solution containing copper (composition: ethylenediaminetetraammineacetic acid (EDTA), copper sulfate, sodium hydroxide, formaldehyde, and pure water) was adjusted to have 43 to 50° C. The after heat treatment-carbon material was immersed in this electroless plating solution and was left for 9 minutes. As a result, a metal-plated carbon material having a metal layer in which a palladium layer and a copper layer were formed in this order on the surfaces of the carbon fibers was obtained.

(Amount of Copper Deposition)

An amount of deposition of copper on the copper layer of the resultant metal-plated carbon material was measured. A result thereof is illustrated in FIG. 7.

Comparative Example 4

(Metal Complex Fixation Step)

A metal-complex-fixed carbon material in which the organopalladium complex was fixed to the surfaces of the carbon fibers was obtained in the same way as the metal complex fixation step of Example 1.

(Heat Treatment Step)

The metal-complex-fixed carbon material in which the organopalladium complex was fixed to the surfaces of the carbon fibers was left for 60 minutes at 160° C. Thus, an after heat treatment-carbon material was obtained.

(First Energization Deposition Step)

An electroless plating solution containing copper (composition: ethylenediaminetetraammineacetic acid (EDTA), copper sulfate, sodium hydroxide, formaldehyde, and pure water) was adjusted to have 43 to 50° C. The metal-complex-fixed carbon material and an electrode were immersed in this electroless plating solution, and were energized for 1 minute at the current density of 0.0002 A/cm$^2$. As a result, a metal-plated carbon material having a metal layer in which a palladium layer and a copper layer were formed in this order on the surfaces of the carbon fibers was obtained.

(Electroless Plating Step)

An electroless plating solution containing copper (composition: ethylenediaminetetraammineacetic acid (EDTA), copper sulfate, sodium hydroxide, formaldehyde, and pure water) was adjusted to have 43 to 50° C. The after heat treatment-carbon material was immersed in this electroless plating solution and was left for 9 minutes. As a result, a metal-plated carbon material having a metal layer in which a palladium layer and a copper layer were formed in this order on the surfaces of the carbon fibers was obtained.

(Cross-Sectional TEM Analysis)

Figure 6:
FIG. 6 illustrates a result of cross-sectional TEM (transmission electron microscope) observation of a metal-plated carbon material in Comparative Example 1.

A cross section of the resultant fibrous metal-plated carbon material cut along a longitudinal direction of the fibers was observed by using a transmission electron microscope (TEM). A result thereof is illustrated in FIG. 6. FIG. 6 illustrates a result of cross-sectional TEM (transmission electron microscope) observation of the metal-plated carbon material in Comparative Example 4.

The average crystal grain cross-sectional area $A_{CS}$ (nm$^2$) and the average crystal grain size $D_P$ (nm) were calculated from FIG. 6 and the expressions (1) and (2). The average crystal grain cross-sectional area $A_{CS}$ was calculated to be 13110 (nm$^2$), and the average crystal grain size $D_P$ was calculated to be 114 (nm).

It was found from FIGS. 4 to 6 that the average crystal grain size $D_P$ in Example 1 in which heat treatment was not performed was smaller than that in Comparative Example 4 in which heat treatment was performed.

(Bending Resistance)

Bending resistance of the resultant metal-plated carbon material was measured in the same way as in Example 1. A result thereof is illustrated in FIG. 9.

(Consideration Regarding Heat Treatment)

From the above Example 1 and Comparative Examples 1 to 4, it was found that the average crystal grain size of the crystal grains forming the metal layer was increased when heat treatment was performed, and was decreased when energization was performed, instead of heat treatment. This is presumed to be caused by the following mechanism. That is, it is generally said that, in a case where metal particles are heated to a temperature equal to or less than their melting point, grain growth occurs (sintering). For this reason, when heat treatment is performed to decompose adsorbed catalytic metal particles (first metal) as in conventional cases, a particle size of the catalytic metal particles (first metal) adsorbed onto the surface of the carbon material is increased. When the particle size of the catalytic metal particles (first metal) is increased as described above, arrangement of second metal particles deposited on the surface thereof becomes sparse, and the adhesion between the metal layer and the carbon material is presumed to be decreased.

On the other hand, in the disclosure, it is considered that, because energization is performed instead of heat treatment, the particle size of the catalytic metal particles (first metal) adsorbed onto the surface of the carbon material can be kept small. When the particle size of the catalytic metal particles is small as described above, arrangement of the second metal adsorbed onto the surface thereof becomes dense, and the adhesion between the metal layer and the carbon material is presumed to be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A metal-plated carbon material comprising:
   a carbon material; and
   a metal layer covering a surface of the carbon material, wherein
   in the metal layer, crystal grains forming the metal layer have an average crystal grain size of 110 nm or less, and
   the carbon material is selected from the group consisting of a carbon fiber, an aggregate thereof, a carbon nanotube twisted yarn, and an aggregate thereof.

2. The metal-plated carbon material according to claim 1, wherein
   the metal layer is made from one or more metals selected from the group consisting of palladium, copper, nickel, cobalt, gold, silver, and platinum.

3. A method of manufacturing the metal-plated carbon material according to claim 1, comprising:
   a metal complex fixation step of immersing a carbon material in a supercritical fluid or subcritical fluid containing an organometallic complex of a first metal to form a metal-complex-fixed carbon material in which the organometallic complex is fixed to a surface of the carbon material; and
   a first energization deposition step of energizing the metal-complex-fixed carbon material in an electroless plating solution containing a second metal to decompose the organometallic complex of the first metal and deposit the second metal on the surface of the carbon material.

4. A method of manufacturing the metal-plated carbon material according to claim 1, comprising:
   a metal complex fixation step of immersing a carbon material in a supercritical fluid or subcritical fluid containing an organometallic complex of a first metal to form a metal-complex-fixed carbon material in which the organometallic complex is fixed to a surface of the carbon material; and
   a second energization deposition step of energizing the metal-complex-fixed carbon material in a conductive aqueous solution having conductivity of 100 μS/cm or more to decompose the organometallic complex of the first metal and deposit the first metal on the surface of the carbon material.

5. The method according to claim 3, wherein
   the first metal is made from one or more metals selected from the group consisting of palladium, copper, nickel, cobalt, gold, silver, and platinum.

6. The method according to claim 3, wherein
   the second metal is made from one or more metals selected from the group consisting of palladium, copper, nickel, cobalt, gold, silver, and platinum.

7. The method according to claim 3, wherein
   current density of energization in the first energization deposition step or the second energization deposition step is 0.01 A/cm$^2$ or less.

8. The metal-plated carbon material according to claim 1, wherein
   the metal layer has a metal palladium layer and a copper layer, the metal palladium layer covering the surface of the carbon material and the copper layer being formed on the metal palladium layer, and the metal layer has a thickness of 0.05 to 1 μm.

9. The metal-plated carbon material according to claim 1, wherein
the metal layer has a nickel layer and a copper layer, the nickel layer covering the surface of the carbon material and the copper layer being formed on the nickel layer, and the metal layer has a thickness of 0.05 to 1 μm.

* * * * *